(12) United States Patent
Camp, III

(10) Patent No.: US 10,222,029 B2
(45) Date of Patent: Mar. 5, 2019

(54) ARRAY-BASED LIGHTING SYSTEMS AND METHODS OF MANUFACTURING

(71) Applicant: THE BOEING COMPANY, Chicago, IL (US)

(72) Inventor: Randolph C. Camp, III, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/501,532

(22) Filed: Sep. 30, 2014

(65) Prior Publication Data

US 2016/0091173 A1   Mar. 31, 2016

(51) Int. Cl.
| | |
|---|---|
| F21V 5/00 | (2018.01) |
| F21V 5/04 | (2006.01) |
| F21V 7/00 | (2006.01) |
| B64D 11/00 | (2006.01) |
| F21V 13/04 | (2006.01) |
| F21W 107/30 | (2018.01) |
| F21Y 105/10 | (2016.01) |
| F21Y 115/10 | (2016.01) |
| B60Q 3/43 | (2017.01) |

(52) U.S. Cl.
CPC ............ *F21V 13/04* (2013.01); *B60Q 3/43* (2017.02); *F21V 5/007* (2013.01); *F21V 5/045* (2013.01); *F21V 5/048* (2013.01); *B64D 2011/0038* (2013.01); *B64D 2203/00* (2013.01); *F21V 7/005* (2013.01); *F21V 7/0083* (2013.01); *F21W 2107/30* (2018.01); *F21Y 2105/10* (2016.08); *F21Y 2115/10* (2016.08)

(58) Field of Classification Search
None
See application file for complete search history.

(56) References Cited

U.S. PATENT DOCUMENTS

| | | | | |
|---|---|---|---|---|
| 5,422,794 A | * | 6/1995 | Drake | B64D 11/00 244/118.1 |
| 5,709,460 A | * | 1/1998 | Lester | F21S 8/02 362/147 |
| 6,480,219 B1 | * | 11/2002 | Uejima | B41J 2/451 347/241 |

(Continued)

FOREIGN PATENT DOCUMENTS

| | | |
|---|---|---|
| DE | 102010014209 A1 | 10/2011 |
| EP | 3002505 A1 | 4/2016 |

(Continued)

OTHER PUBLICATIONS

LED Magazine, "Reflectors and lenses vie for usage in SSL systems," Nov./Dec. 2013 issue, 9 pages, accessed at http://www.ledsmagazine.com/articles/print/volume-10/issue-12/features/reflectors-and-lenses-vie-for-usage-in-ssl-systems-magazine.html.

(Continued)

*Primary Examiner* — Sharon E Payne
(74) *Attorney, Agent, or Firm* — Patterson + Sheridan, LLP

(57) ABSTRACT

A lighting system includes a substrate, an array of light-emitting diodes (LEDs), and a light cover. The array of LEDs is disposed on the substrate and is arranged in a plurality of LED rows and a plurality of LED columns. The light cover is positioned over the array of LEDs and includes an array of optical elements. Each optical element is substantially aligned with a LED.

17 Claims, 10 Drawing Sheets

(56) References Cited

U.S. PATENT DOCUMENTS

| | | | |
|---|---|---|---|
| 7,494,255 B2 | 2/2009 | Bryan et al. | |
| 2002/0048168 A1* | 4/2002 | Sejkora | F21S 8/04 362/223 |
| 2003/0133307 A1 | 7/2003 | Sugihara et al. | |
| 2007/0109802 A1 | 5/2007 | Bryan et al. | |
| 2008/0186721 A1* | 8/2008 | Vogel | B64D 11/00 362/471 |
| 2008/0266893 A1* | 10/2008 | Speier | F21S 2/005 362/551 |
| 2008/0316740 A1 | 12/2008 | Okawa et al. | |
| 2009/0161360 A1* | 6/2009 | Li | F21V 5/048 362/235 |
| 2009/0225543 A1* | 9/2009 | Jacobson | F21V 5/007 362/247 |
| 2010/0195330 A1 | 8/2010 | Schaefer et al. | |
| 2011/0063857 A1 | 3/2011 | Li et al. | |
| 2011/0194281 A1 | 8/2011 | Josefowicz et al. | |
| 2016/0091173 A1 | 3/2016 | Camp, III | |

FOREIGN PATENT DOCUMENTS

| | | | | |
|---|---|---|---|---|
| GB | 2478075 A | | 8/2011 | |
| JP | 2005259653 A | | 9/2005 | |
| WO | WO 99/505596 | * | 10/1999 | F12Q 3/00 |
| WO | 01/16524 A1 | | 3/2001 | |
| WO | 2010/103477 A1 | | 9/2010 | |

OTHER PUBLICATIONS

Sun et al., "Collimating lamp with well color mixing of red/green/blue LEDs," Optics Express, vol. 20, No. S1, 10 pages, Jan. 2, 2012.

Extended European Search Report for EP 15181415.9, dated Dec. 1, 2015.

European Examination Report for Application No. 15 181 415.9-1015 dated Jun. 14, 2018.

* cited by examiner

ARRAY-BASED LIGHTING SYSTEMS AND METHODS OF MANUFACTURING

FIELD

The present disclosure generally relates to lighting systems, and more specifically, to array-based lighting systems.

BACKGROUND

Recent advances in light-emitting diode (LED) technology, including improvements in color accuracy, device longevity, energy efficiency, and manufacturing costs, have made LEDs a popular choice for many lighting applications. In particular, LED technology is commonly used in lighting applications where energy efficiency, size, and/or color accuracy are important. For example, in mobile applications, such as automotive and aeronautical applications, size and energy efficiency are important factors that are taken into consideration when choosing a lighting system.

Lighting systems that utilize LED technology typically include optical elements that alter various characteristics of the light emitted by the LEDs. For example, a diffraction grating may be positioned over one or more LEDs in order to diffuse light emitted by the LED(s). Alternatively, a lens may be used to collimate or focus the light emitted by the LED(s).

Conventional lighting systems generally provide adequate illumination and efficiency for large-scale applications, such as in a home or office setting, where there is sufficient space to position a number of relatively large lighting modules within an area to be illuminated. However, such lighting systems typically are poorly suited for mobile applications where space is limited. For example, in many mobile environments (e.g., automotive, aeronautical, etc.), space constraints require lighting systems to be placed in close proximity to architectural features, such as wall panels, moldings, and/or compartment openings included in the mobile environment. Consequently, surfaces in the mobile environment may be illuminated non-uniformly. For example, surfaces that are in close proximity to the lighting system may be illuminated more brightly, creating harsh and visually displeasing results. Additionally, surfaces in the mobile environment that more distant from and/or oriented at steep angles to the lighting system will be under-illuminated, further interfering with the desired effect of the lighting system.

Therefore, there is a need for improved lighting systems for use in a variety of lighting applications, such as mobile applications.

SUMMARY

According to one embodiment of the present disclosure, a lighting system includes a substrate, an array of light-emitting diodes (LEDs), and a light cover. The array of LEDs is disposed on the substrate and is arranged in a plurality of LED rows and a plurality of LED columns. The light cover is positioned over the array of LEDs and includes an array of optical elements. Each optical element is substantially aligned with a LED.

According to another embodiment of the present disclosure, a lighting system includes a substrate, an array of light-emitting diodes (LEDs), and a light cover. The array of LEDs is disposed on the substrate and is arranged in a plurality of LED rows and a plurality of LED columns. The light cover is positioned over the array of LEDs. The light cover includes an array of optical elements. The array of optical elements is arranged in a plurality of optical element rows that are substantially aligned with the plurality of LED rows and a plurality of optical element columns that are substantially aligned with the plurality of LED columns.

According to yet another embodiment of the present disclosure, a method of manufacturing a light cover having an array of optical elements includes forming a first plurality of optical elements on a surface of the light cover, forming a second plurality of optical elements on the surface of the light cover, and forming a third plurality of optical elements on the surface of the light cover. The first plurality of optical elements includes a first lens type, the second plurality of optical elements includes a second lens type, and the third plurality of optical elements includes a third lens type.

DETAILED DESCRIPTION

Figure 1B:
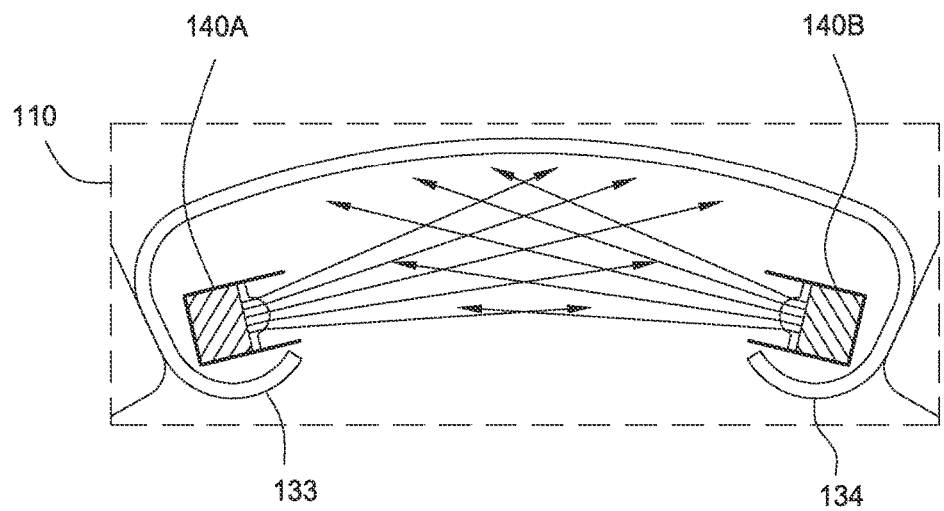
FIGS. 1A and 1B illustrate a schematic cross-sectional view of a passenger cabin of a commercial airliner in accordance with aspects of the disclosure.
Figure 1A:
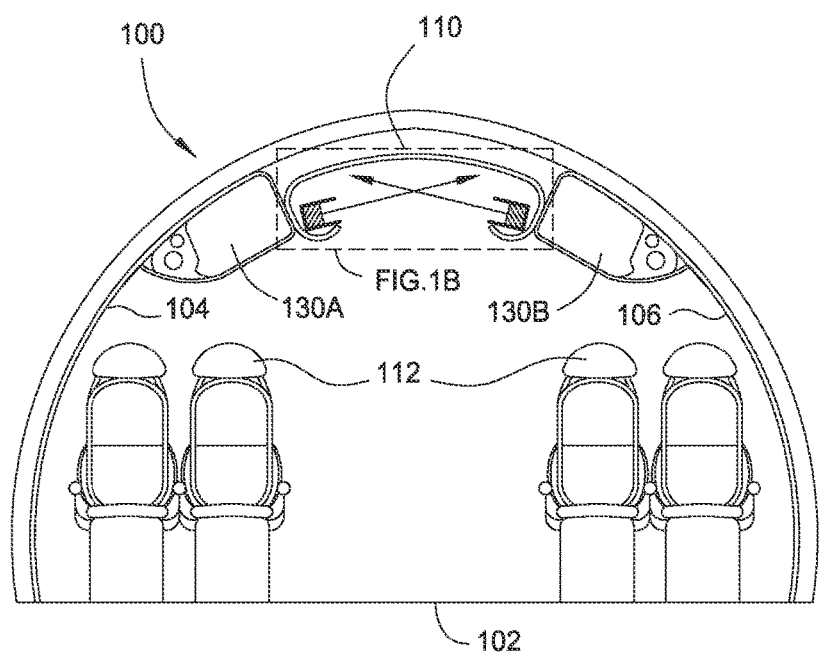

FIGS. 1A and 1B illustrate a schematic cross-sectional view of a passenger cabin 100 of a commercial airliner in accordance with aspects of the disclosure. The passenger cabin 100 includes a floor panel 102, a pair of sidewall members or panels 104 and 106, a ceiling structure 110, and a plurality of passenger seats 112. The passenger cabin 100 may further include a plurality of outboard storage/stowage bins 130A and 130B. The bins 130A, 130B are positioned near an upper portion of the sidewall members 104, 106 and the ceiling structure 110.

The ceiling structure 110 of a single-aisle aircraft generally has a curved, arch-type shape, as shown in FIGS. 1A and 1B. The curved configuration starts at the upper portion of the sidewall members 104, 106, which are positioned immediately adjacent the outboard storage bins 130A and 130B. The ceiling structure 110 includes a pair of LED lighting modules 140A, 140B on either side of the ceiling structure 110. The LED lighting modules 140A, 140B illuminate the inner surface of the ceiling structure 110. In other aircraft configurations, additional LED lighting modules may be utilized to illuminate the surfaces of the stowage/storage bins 130B and 130A as well.

Figure 2A:
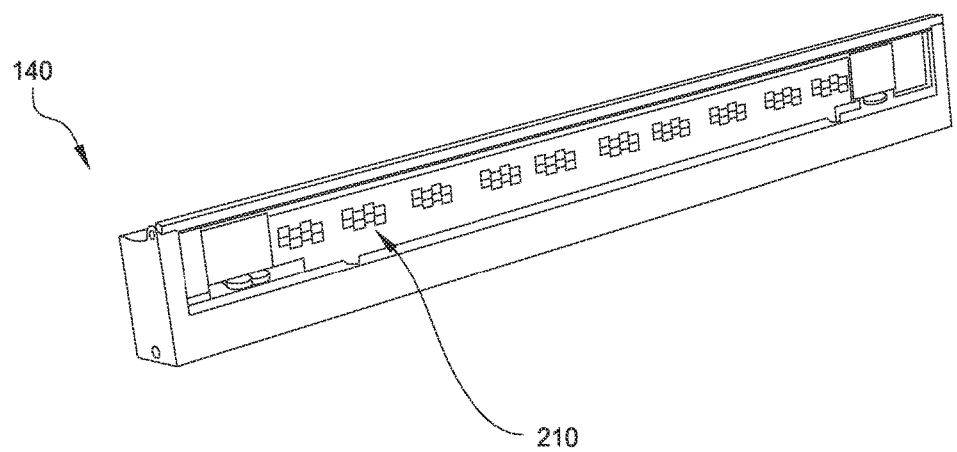
FIGS. 2A and 2B illustrate perspective views of a LED lighting module that may be used in passenger cabin.
Figure 2B:
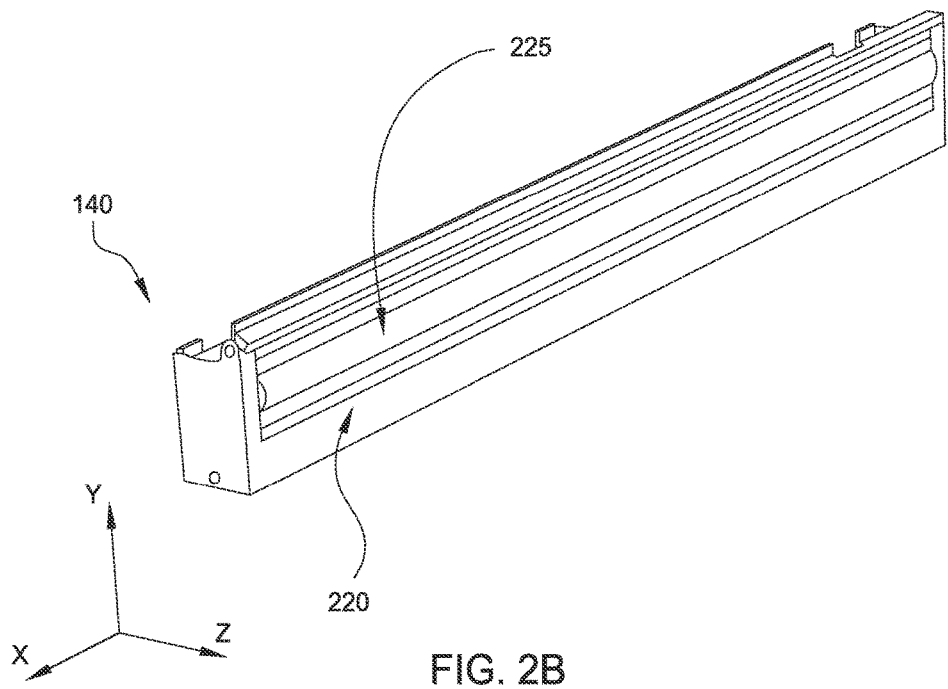

FIGS. 2A and 2B illustrate perspective views of a LED lighting module 140 that may be used in passenger cabin 100. The LED lighting module 140 includes a plurality of LEDs 210 arranged linearly along the length of the LED lighting module 140. As shown in FIG. 2B, the LED lighting module 140 further includes a light cover 220 having a coarse optical element 225. When the light cover 220 is positioned over the LEDs 210, the coarse optical element 225 disperses the light emitted by the LEDs 210.

In general, the coarse optics used in various types of lighting systems provide very little control over the characteristics of emitted light. Consequently, although LED lighting module 140 may provide satisfactory illumination of a relatively flat surface that is separated from the LED lighting module 140 by a sufficient distance (e.g., 12 inches or more), the coarse optical element 225 of the LED lighting module 140 is unable to provide proper illumination when positioned close to architectural features having significant topographical variations. For example, in the passenger cabin configuration shown in FIGS. 1A and 1B, the LED lighting module 140 may be used to project light onto the ceiling structure 110, which is positioned approximately 12 to 36 inches away from the LED lighting module 140. In this particular application, because the surface to be illuminated does not include significant topographical variations, the intensity of the projected light may appear uniform over the relatively flat surface of the ceiling structure 110, producing satisfactory results. Additionally, minor variations in the projected light pattern that may be produced by the coarse optical element 225 included in the LED lighting module 140 are less visible when the illuminated surface is positioned further away from the lighting module. Accordingly, relatively uniform light may be projected onto the ceiling structure 110 by the LED lighting module 140.

By contrast, when the LED lighting module 140 is placed in close proximity to architectural features included in passenger cabin 100, surfaces that are near the LED lighting module 140 will be illuminated more brightly than surfaces that are positioned at a further distance from the LED lighting module 140. Such lighting non-uniformities may detract from the appearance of the passenger cabin 100 and/or interfere with the mood that certain aspects of the ambient lighting are intended to create. Moreover, similar non-uniformities may be experienced when similar types of LED lighting modules are used in other applications, including automotive applications, personal mobile devices, ambient lighting, and the like. Furthermore, as LED technology is continuously adapted for new applications that require smaller form factors, these and other limitations of the coarse optics used in such lighting systems continue to limit the flexibility and efficiency of lighting system designs.

Accordingly, the present disclosure describes various techniques for combining an array of LEDs with an array of optical elements to enable light emission characteristics to be more accurately controlled and tailored to meet the specific requirements of a given lighting application. Such techniques are described below in further detail in conjunction with FIGS. 3A-6.

Array-Based Lighting Systems

Figure 3A:
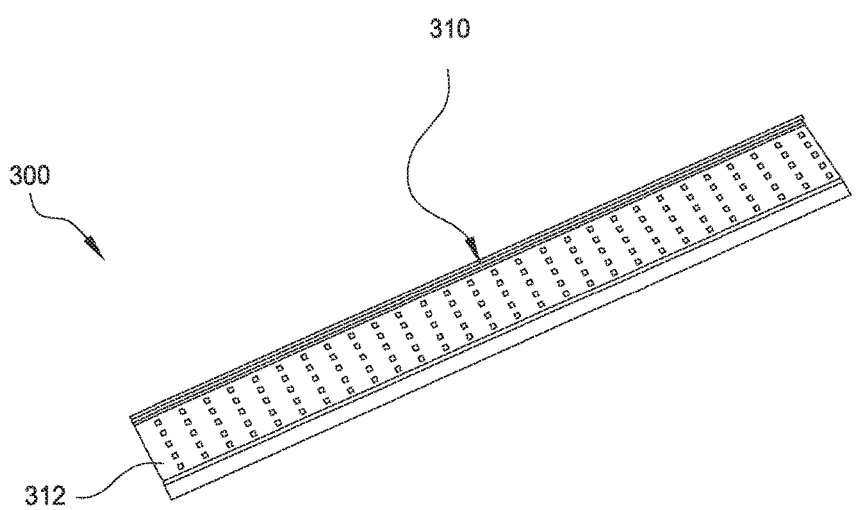
FIGS. 3A-3D illustrate an array-based lighting module in accordance with embodiments of the disclosure.
Figure 3B:
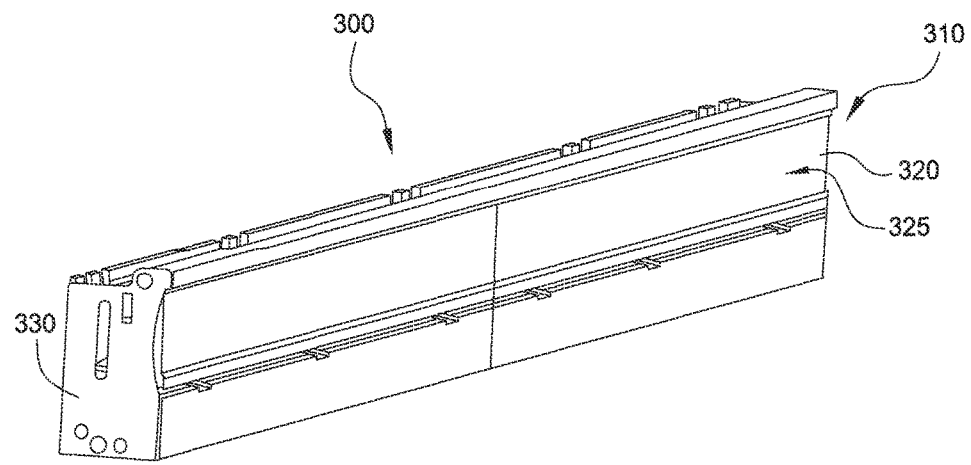
Figure 3D:
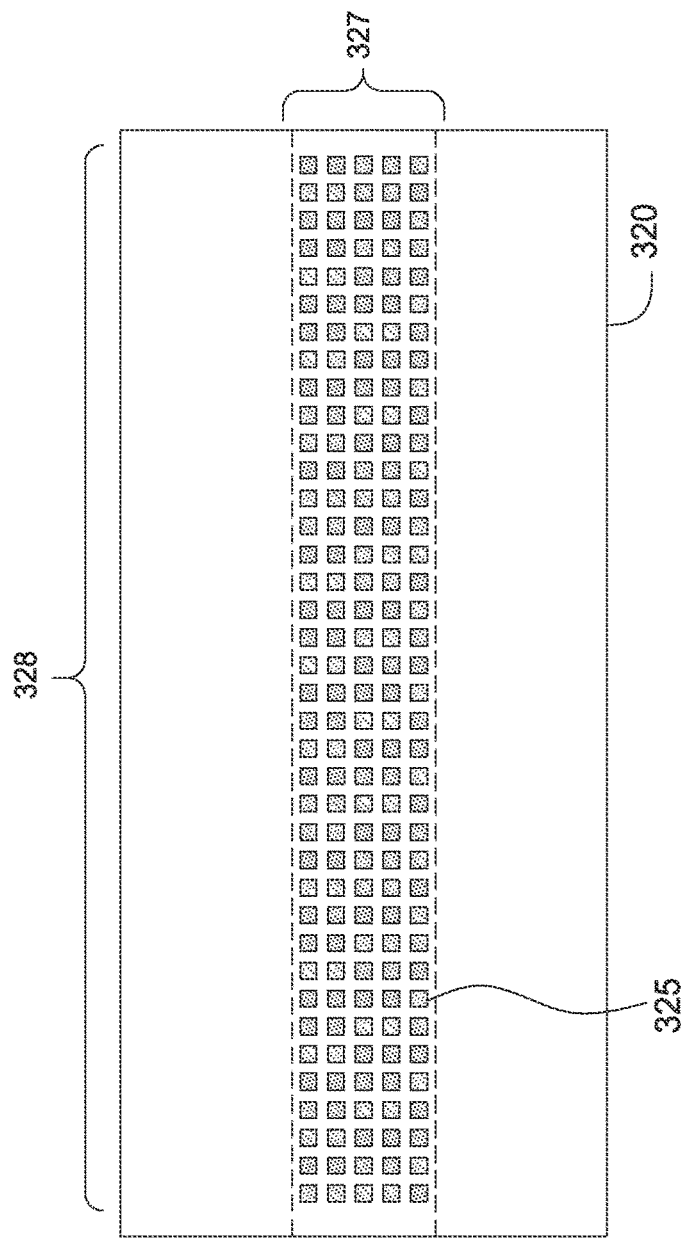
Figure 3C:
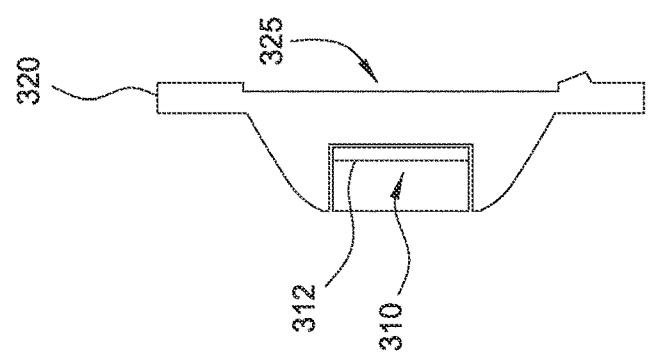

FIGS. 3A-3D illustrate an array-based lighting module 300 in accordance with embodiments of the disclosure. The lighting module 300 includes an array of LEDs 310 and a light cover 320. As shown in FIG. 3D, the light cover 320 may include an array of optical elements 325.

In some embodiments, each optical element 325 is associated with a different LED included in the array of LEDs 310 such that the light emitted by each LED can be individually controlled to match the requirements of a specific lighting application. For example, each LED 310 may be substantially aligned with a different optical element 325 included on the light cover 320 so that the output of each LED 310 can be controlled. Additionally, in the same or other embodiments, one or more rows 327 and/or columns 328 included in the array of optical elements 325 may be substantially aligned with one or more rows and/or columns included in the array of LEDs 310.

The optical elements 325 may be formed on the light cover 320 via any suitable technique, including injection molding, laser etching, abrading, laminating, polishing, etc. For example, one or more surfaces of the light cover 320 may be modified to form the optical elements 325, such as by physical abrasion, chemical etching, patterning, and the like. Additionally, optical elements 325 may be deposited or otherwise disposed on one or more surfaces of the light cover 320, such as via adhesion, chemical deposition, physical deposition, and the like. For example, the optical elements 325 may include a series of lenses that are adhered to, or formed on, one or more surfaces of the light cover 320. In various embodiments, the optical elements 325 include diffusers, collimators, convex lenses, concave lenses, plano-convex lenses, plano-concave lenses, aspheric lenses, Fresnel lenses, and/or the like. In some embodiments, any of the optical elements 325 described above include micrometer-scale features (e.g., micro-optics).

Figure 3E:
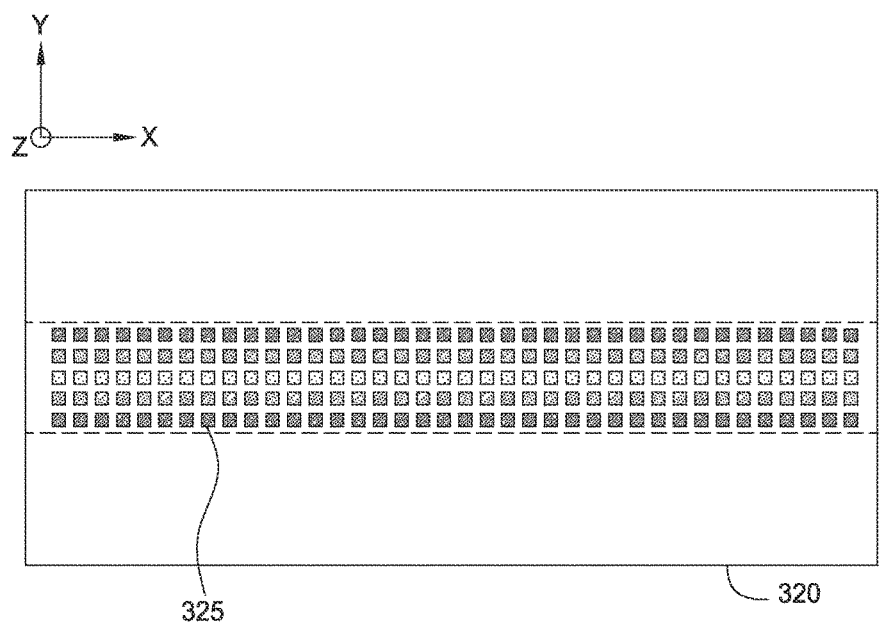
FIGS. 3E-3I illustrate various light cover configurations that may be used with the array-based lighting module in accordance with embodiments of the disclosure.
Figure 3F:
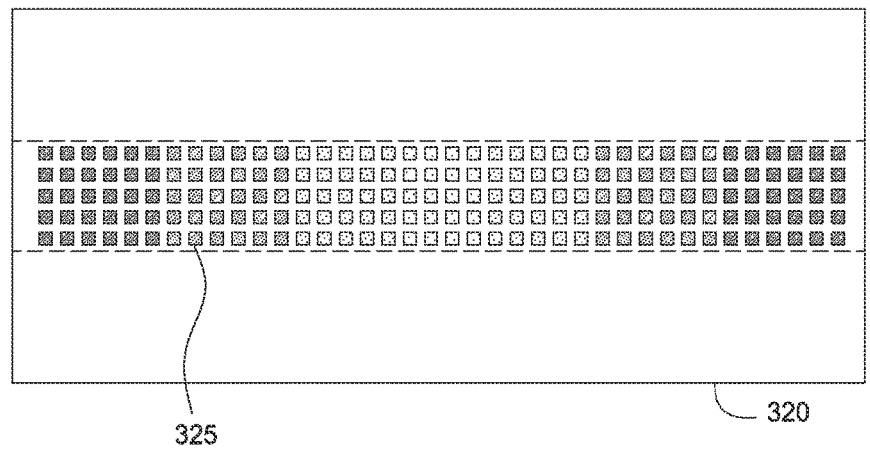

All of the optical elements 325 may be substantially similar to each other, as shown in FIG. 3D. For example, all of the optical elements 325 may be Fresnel lenses that are configured to collimate light in a certain direction. In other embodiments, the types of optical elements 325 may vary as a function of row 327, as shown in FIG. 3E, and/or as a function of column 328, as shown in FIG. 3F. For example, each row 327 and/or column 328 of the LED array 310 may include a different type of optical element. In another example, each row 327 and/or column 328 of the LED array 310 may include the same class of optical element (e.g., Fresnel lens, plano-concave lens, etc.), but the direction in which light is projected by the optical element may be different for each row 327, column 328, etc. For instance, the configuration shown in FIG. 3E may be utilized in lighting applications where uniform light distribution is desired along the x-direction, but variable light distribution is desired along the y-direction. Accordingly, the same class of optical element may be used for each row 327, but the specific behavior of the optical elements 325 (e.g., projected light direction, focal length, dispersion, etc.) may be varied as a function of row 327. In another specific embodiment, the configuration shown in FIG. 3F may be utilized in lighting applications where uniform light distribution is desired along the y-direction, but variable light distribution is desired along the x-direction. Accordingly, the same class of optical element may be used for each column 328, but the specific behavior of the optical elements 325 (e.g., projected light direction, focal length, dispersion, etc.) may be varied as a function of column 328. In still other embodiments, different types of optical elements 325 may be used in different regions of the light cover 320. For example, one or more types of optical element 325 may be used in one or more corner regions of the light cover 320, and a different type of optical element 325 may be used in a center region of the light cover 320. In other embodiments, the regions in which different types of optical elements 325 are disposed correspond to different columns, rows, or other types/shapes of areas that bound optical elements 325 included on the light cover 320.

Figure 3G:
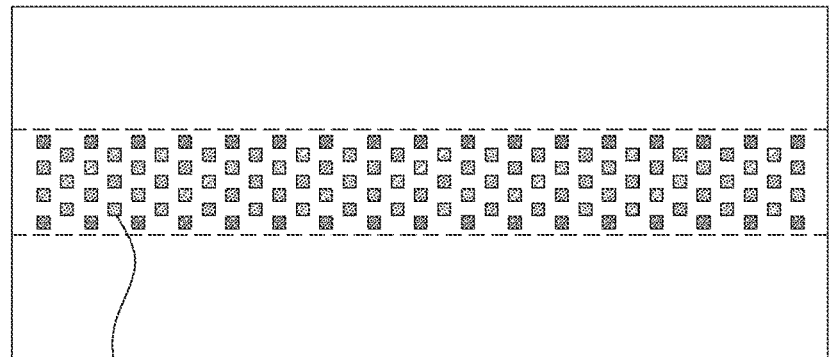
Figure 3H:
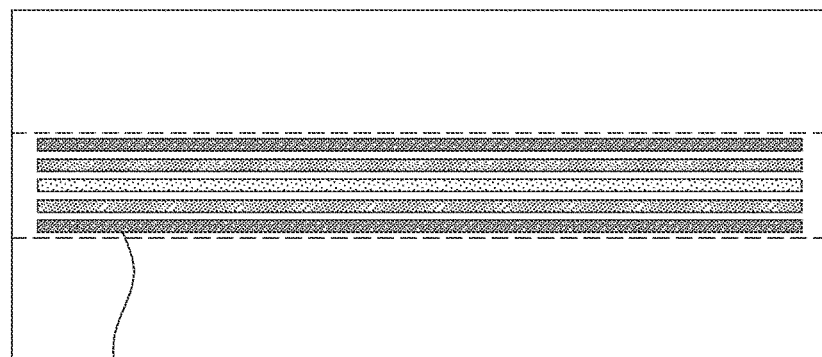
Figure 3I:
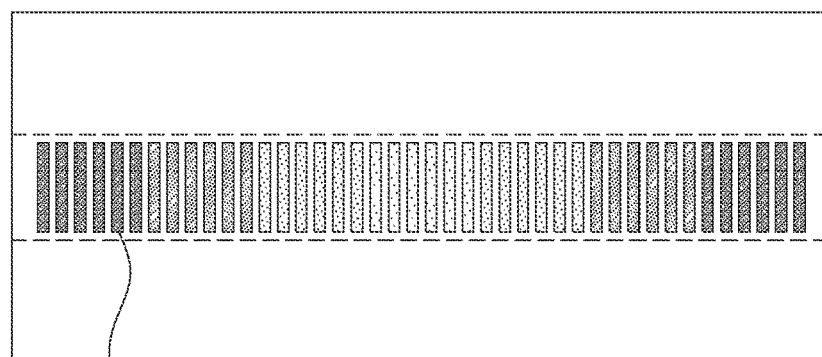

In general, the optical elements 325 and/or LEDs 310 may be arranged in any type of pattern that is useful for a particular lighting application. For example, in some embodiments, the optical elements 325 and/or LEDs 310 may be arranged in a rectangular array, as shown in FIGS. 3D-3F. In some embodiments, the rows 327 and/or columns 328 of optical elements 325 and/or LEDs 310 may be staggered with respect to one another, as shown in FIG. 3G. In another embodiment, the LEDs 310 are arranged in a freeform pattern that does not include rows and/or columns. In other embodiments, the optical elements 325 associated with a particular row 327 and/or column 328 of LEDs 310 may placed side-by-side, such that the optical elements appear to be continuous along a given row 327, as shown in FIG. 3H, and/or along a given column 328, as shown in FIG. 3I.

In various embodiments, the light cover 320 may be composed of a plastic, glass, and/or crystalline material that is substantially transparent and/or partially transparent. For example, the light cover 320 may be composed of a polymer, such as polycarbonate, acrylic, etc., that is formed via injection molding. In some embodiments, the light cover 320 may have a width (e.g., the y-direction shown in FIG. 3B) of approximately 12 inches or less, such as approximately 3 inches or less, or approximately 1.5 to 0.5 inches. The light cover 320 may have a length (e.g., the x-direction shown in FIG. 3B) of approximately 6 to 60 inches, such as approximately 6 to 48 inches. The light cover 320 may be mounted over a substrate 312 (e.g., a printed circuit board) on which the array of LEDs 310 is disposed using any practical means, including an adhesive, an interlocking structure, and/or one or more fasteners. For example, the light cover 320 may be mounted on or in a base assembly 330 that houses the light cover 320, LED array 310, power transformers, and/or the like. Additionally, one or more LEDs included in the LED array 310 may be mounted proximate to a reflector, as described below in further detail in conjunction with FIGS. 5A and 5B. In some embodiments, the thickness (e.g., the z-direction shown in FIG. 3B) of the lighting module 300 is less than approximately 1 inch, such as approximately 0.7 inches or less.

The LEDs 310 may include red, green, and/or blue (RGB) LEDs or LEDs having any other color. In some embodiments, the output of multiple LEDs may be mixed, such as to produce light that is substantially white in appearance. Further, the LEDs 310 may include other optical components (e.g., phosphors) that are combined with specific LED colors, such as yellow and/or ultraviolet (UV), to generate one or more wavelengths of light included in and/or outside of the visible spectrum.

In order to improve the efficiency of the lighting module 300, LEDs 310 having a small light-emitting surface area (e.g., approximately 2 mm$^2$ or less, such as 1 mm$^2$ or less) may be used. Using LEDs 310 having a small light-emitting surface area allows the luminous flux outputted by the LEDs 310 to be used more efficiently, particularly when compact lighting module sizes are desired. That is, devices that use large light-emitting surface areas typically require large optical elements to sufficiently utilize the luminous flux generated by the light-emitting surface and achieve a reasonable level of efficiency. By contrast, devices that use small light-emitting surface areas may be used in conjunction with smaller optical elements, allowing for more compact lighting modules, while still efficiently using the luminous flux generated by the light-emitting surface. Accordingly, by combining an array of LEDs 310 having small light-emitting surface areas with an array of relatively small optical elements 325 (e.g., optical elements having a surface area of approximately 50 mm$^2$ or less, such as approximately 10 mm$^2$ or less), a compact lighting module 300 that projects light in a highly-controllable fashion may be produced.

Figure 4:
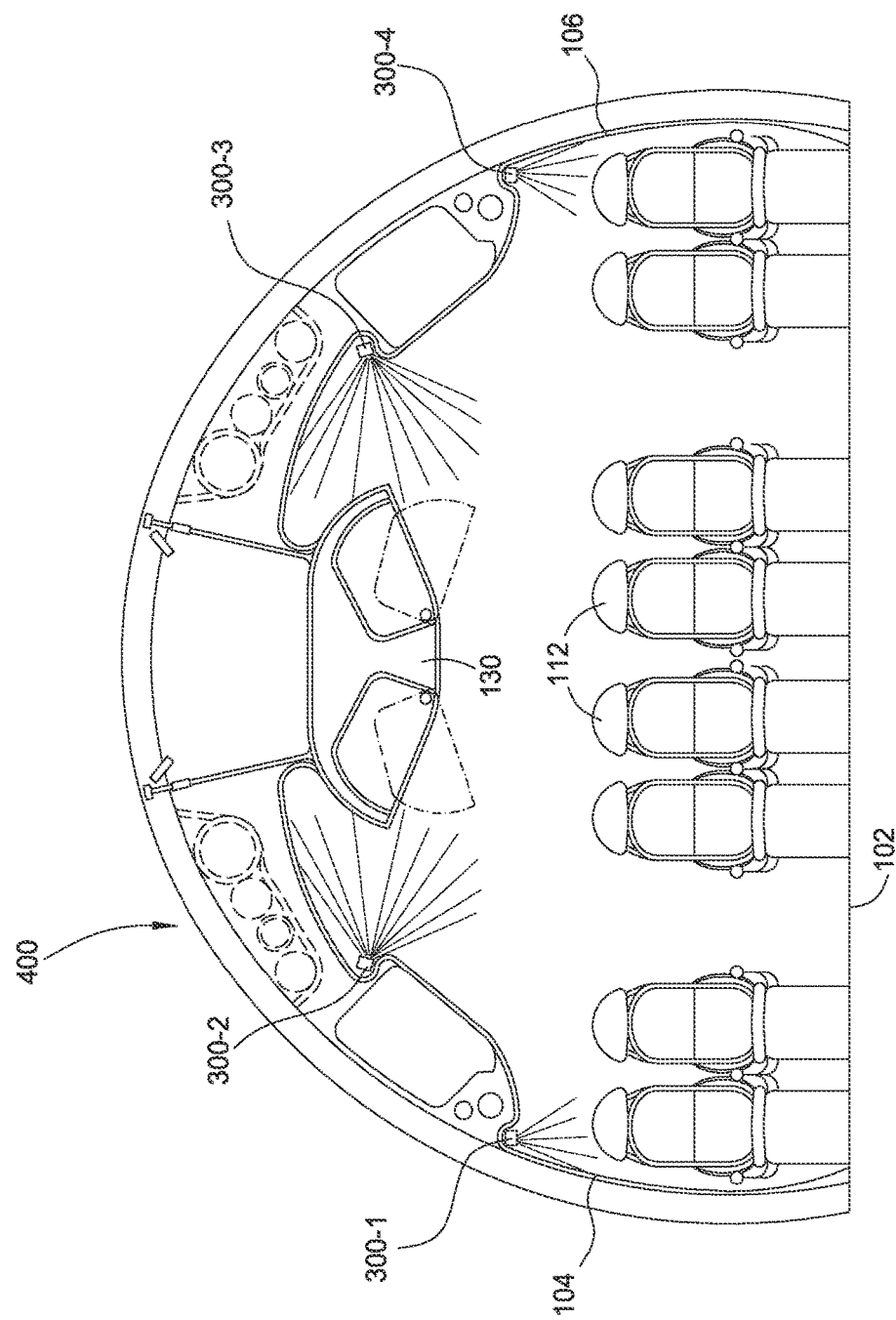
FIG. 4 illustrates a schematic cross-sectional view of LED lighting modules disposed within a passenger cabin of a commercial airliner in accordance with embodiments of the disclosure.

FIG. 4 illustrates a schematic cross-sectional view of LED lighting modules 300 disposed within a passenger cabin 400 of a commercial airliner in accordance with embodiments of the disclosure. As shown, state-of-the-art passenger cabin configurations may dispose multiple compact lighting modules within openings at various locations in the passenger cabin 400. In general, using multiple lighting modules enables more advanced lighting effects to be achieved. However, when lighting modules are located near architectural features that include significant topographical variations and/or near the passengers themselves, care must be taken to ensure that light is projected in an appropriate manner to achieve the desired effect.

For example, lighting modules 300-2, 300-3 are positioned across from outboard storage/stowage bins 130. Consequently, if uniform illumination of the outboard storage/stowage bins 130 is desired, the light output of the lighting modules 300-2, 300-3 may be controlled such that more light is directed to the underside of the outboard storage/stowage bins 130 and less light is directed to the surface of the outboard storage/stowage bins 130 nearest the lighting modules 300-2, 300-3. In order to achieve these lighting characteristics, the lighting module 300 configuration shown in FIG. 3E may be utilized so that uniform light distribution is achieved along the length of the outboard storage/stowage bins 130, but variable light distribution is achieved along the height of the outboard storage/stowage bins 130. More specifically, in one embodiment, the center row(s) 327 of optical elements 325 included in the lighting module 300 may be configured to reduce the intensity of light that is projected onto the surface of the outboard storage/stowage bins 130 nearest the lighting modules 300-2, 300-3. The lower row(s) 327 of optical elements 325 included in the lighting module 300 may then be configured to increase the intensity of light that is projected onto the underside of the outboard storage/stowage bins 130. Additionally, one or more of the center row(s) 327 of optical elements 325 may also be configured to project some amount of light onto the underside of the outboard storage/stowage bins 130 in order to compensate for insufficient illumination provided by the lower row(s) 327 of optical elements 325. Accordingly, the location(s) at which light is projected may be tailored to the specific requirements of a particular lighting application via the array of optical elements 325.

Similar techniques for varying the amount of light projected at certain locations within the passenger cabin 400 may be used with the variable column 328 light cover 320 shown in FIG. 3F. For example, the light cover 320 shown in FIG. 3F, in which the optical elements 325 vary as a function of column 328, may be used for the lighting modules 300-1 and 300-4 disposed near the sidewall members 104, 106 of the passenger cabin. In one embodiment, the variable column 328 light cover 320 may be configured to project a first light intensity towards the passenger foot well and project a second light intensity towards the passenger seat 112. In the same or other embodiments, the variable column 328 light cover 320 may be used to control the angle(s) at which light is projected from each column 328 of the light cover 320, such as to reduce the degree to which light is projected directly into passengers' eyes. In yet another embodiment, the light output of lighting modules 300-1, 300-4 may be controlled such that the light is distributed evenly along the sidewall members 104, 106 and not projected directly onto the passenger seats 112, for example, using the light cover 320 shown in FIG. 3E. In still other embodiments, aspects of two or more of the light covers 320 shown in FIGS. 3D-3I may be combined to achieve a specific lighting effect.

Figure 5A:
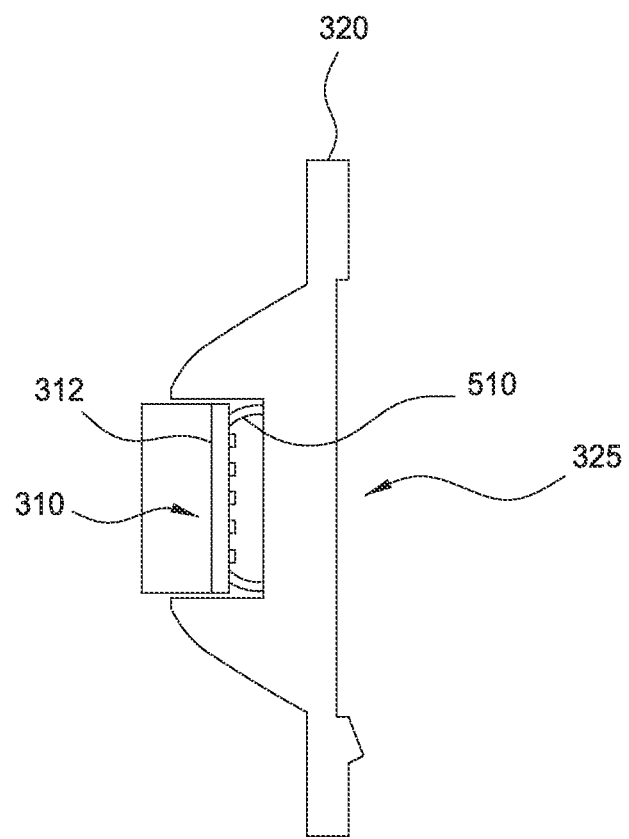
FIGS. 5A and 5B illustrate schematic cross-sectional views of reflectors positioned between the LED array and the light cover of FIGS. 3A-3I in accordance with embodiments of the disclosure.
Figure 5B:
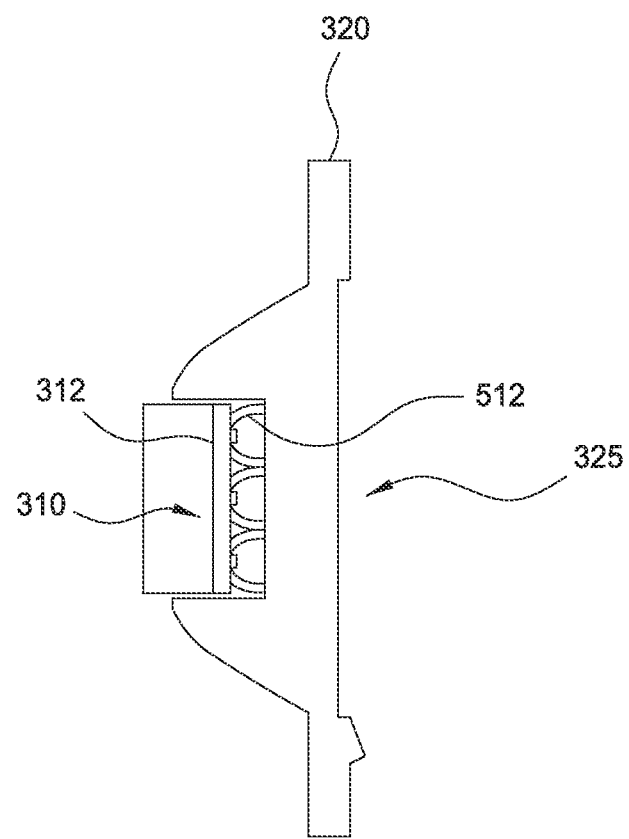

FIGS. 5A and 5B illustrate schematic cross-sectional views of reflectors positioned between the LED array 310 and the light cover 320 of FIGS. 3A-3I in accordance with embodiments of the disclosure. As shown in FIG. 5A, a reflector 510 may be positioned proximate to the LED array 310 in order to control the direction of light rays emitted by the LED array 310. For example, the reflector 510 may increase the amount of luminous flux that is projected towards the light cover 320 and/or may collimate light rays emitted by the LED array 310, improving device efficiency and/or uniformity. In other embodiments, reflectors 512 may be disposed proximate to each LED or proximate to each row 327 of LEDs, as shown in FIG. 5B. Alternatively, reflectors 512 may be disposed proximate to each column 328 of LEDs included in the LED array 310. Disposing additional reflectors 512 proximate to the LED array 310 (e.g., on a per-LED, per-row, and/or per-column basis) may further enhance the efficiency and/or uniformity of the lighting module 300 by providing more precise control over the light emission characteristics of the LED array 310.

Figure 6:
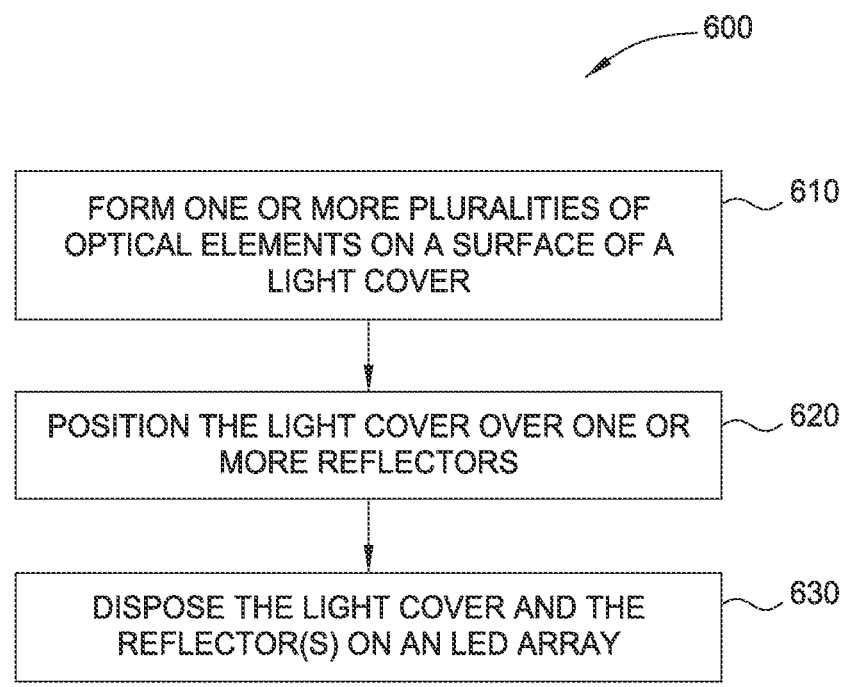
FIG. 6 is a flow chart of a method for manufacturing a light cover in accordance with embodiments of the disclosure.

FIG. 6 is a flow chart of a method 600 for manufacturing a light cover 320 in accordance with embodiments of the disclosure. Although the method 600 is described in conjunction with FIGS. 3A-5B, persons skilled in the art will understand that any system configured to perform the method, in any appropriate order, falls within the scope of the present disclosure.

The method 600 begins at step 610, where one or more pluralities of optical elements 325 are formed on a surface of the light cover 320. In some embodiments, each plurality of optical elements 325 includes a different lens type. For example, a first plurality of optical elements 325 formed on the light cover 320 may include plano-concave lenses that project light in a first direction and/or with a first divergence angle, and a second plurality of optical elements 325 formed on the light cover 320 may include plano-concave lenses that project light in a second direction and/or with a second divergence angle. In other embodiments, the optical elements 325 may include other types of lenses having the same or different directionalities, densities, patterns, projection angles, focal lengths, etc., such as diffuse lenses, collimating lenses, convex lenses, concave lenses, plano-convex lenses, aspheric lenses, Fresnel lenses, and the like. In still other embodiments, all of the optical elements 325 may include the same lens type. In general, the optical elements 325 may be formed on the light cover 320 using any practical technique, such as the fabrication techniques described above.

In some embodiments, a first plurality of optical elements 325 formed on the light cover 320 may form a first row of optical elements, a second plurality of optical elements 325 formed on the light cover 320 may form a second row of optical elements, and a third plurality of optical elements 325 formed on the light cover 320 may form a third row of optical elements, and so on. In other embodiments, a first plurality of optical elements 325 formed on the light cover 320 may form a first column of optical elements, a second plurality of optical elements 325 formed on the light cover 320 may form a second column of optical elements, and a third plurality of optical elements 325 formed on the light cover 320 may form a third column of optical elements, and so on.

Next, at step 620, the light cover 320 is positioned over one or more reflectors 510, 512 and, at step 630, the light cover 320 and the reflector(s) 510, 512 are disposed on an LED array 310. In some embodiments, a single reflector 510 may be positioned around the periphery of the LED array 310. In other embodiments, one or more reflectors 512 may be positioned proximate to individual LEDs 310 and/or proximate to specific rows 327 and/or columns 328 of LEDs 310. The method 600 then ends.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, aspects and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware aspect, an entirely software aspect (including firmware, resident software, micro-code, etc.) or an aspect combining software and hardware aspects that may all generally be referred to herein as a "circuit," "module" or "system."

The flowchart and block diagrams in the Figures illustrate the functionality and operation of possible implementations of systems and methods according to various aspects of the present invention. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

While the foregoing is directed to aspects of the present invention, other and further aspects of the invention may be devised without departing from the basic scope thereof, and the scope thereof is determined by the claims that follow.

What is claimed is:

1. A lighting system for a passenger cabin of an airliner, comprising:
   a ceiling structure having a curved, arch-type shape; and
   a first lighting module and a second lighting module
      disposed on opposing sides of the ceiling structure and positioned to direct light onto the ceiling structure, each lighting module comprising:
a printed circuit board;
an array of light-emitting diodes (LEDs) disposed on the printed circuit board, the array of LEDs arranged in a plurality of LED rows and a plurality of LED columns, each LED of the array of LEDs having a light emitting surface area less than 2 mm$^2$; and
a light cover positioned over the array of LEDs, the light cover formed from polycarbonate and comprising one or more modified surfaces that form an array of micro-optical elements, wherein each micro-optical element is substantially aligned with at least one LED, wherein a width of the light cover is less than about 1.5 inches, and a length of the light cover is more than about 6 inches.

2. The lighting system of claim 1, wherein the array of micro-optical elements is arranged in a plurality of micro-optical element rows and a plurality of micro-optical element columns, the plurality of micro-optical element rows are substantially aligned with the plurality of LED rows, and the plurality of micro-optical element columns are substantially aligned with the plurality of LED columns.

3. The lighting system of claim 1, wherein a first region of micro-optical elements included in the array of micro-optical elements comprises a first lens type, a second region of micro-optical elements included in the array of micro-optical elements comprises a second lens type, a third region of micro-optical elements included in the array of micro-optical elements comprises a third lens type, and each of the first lens type, second lens type, and third lens type is a different lens type.

4. The lighting system of claim 3, wherein the first lens type, the second lens type, and the third lens type are selected from the group consisting of a diffuser, a collimator, an aspheric lens, and a Fresnel lens.

5. The lighting system of claim 3, wherein the first lens type provides a first light projection direction, the second lens type provides a second light projection direction, the third lens type provides a third light projection direction, and each of the first light projection direction, second light projection direction, and third light projection direction is a different light projection direction.

6. The lighting system of claim 3, wherein the first region comprises a first row of micro-optical elements included in the array of micro-optical elements, the second region comprises a second row of micro-optical elements included in the array of micro-optical elements, and the third region comprises a third row of micro-optical elements included in the array of micro-optical elements.

7. The lighting system of claim 3, wherein the first region comprises a first column of micro-optical elements included in the array of micro-optical elements, the second region comprises a second column of micro-optical elements included in the array of micro-optical elements, and the third region comprises a third column of micro-optical elements included in the array of micro-optical elements.

8. The lighting system of claim 1, wherein the LEDs are arranged in a rectangular array.

9. The lighting system of claim 1, wherein a light-emitting surface area of each LED included in the array of LEDs is less than about 1 mm$^2$.

10. The lighting system of claim 1, further comprising a plurality of reflectors disposed proximate to the array of LEDs between the printed circuit board and the light cover.

11. The lighting system of claim 10, wherein the plurality of reflectors comprises at least one reflector for each LED row included in the plurality of LED rows.

12. The lighting system of claim 10, wherein the plurality of reflectors comprises at least one reflector for each LED included in the array of LEDs.

13. The lighting system of claim 1, wherein each lighting module is positioned 12 inches to 36 inches from a projected upon surface of the ceiling structure.

14. A lighting system for a passenger cabin of an airliner, comprising:
a ceiling structure having a curved, arch-type shape; and
a first lighting module and a second lighting module disposed on opposing sides of the ceiling structure and positioned to direct light onto the ceiling structure, each lighting module comprising:
a printed circuit board;
an array of red, green, and blue light-emitting diodes (RGB LEDs) disposed on the printed circuit board, the array of RGB LEDs arranged in a plurality of LED rows and a plurality of LED columns, each LED of the array of RGB LEDs having a light emitting surface area less than 2 mm$^2$; and
a light cover positioned over the array of RGB LEDs, the light cover formed from polycarbonate and comprising one or more modified surfaces that form an array of micro-optical elements, the array of micro-optical elements arranged in a plurality of micro-optical element rows that are substantially aligned with the plurality of LED rows and a plurality of micro-optical element columns that are substantially aligned with the plurality of LED columns.

15. The lighting system of claim 14, wherein a first row of micro-optical elements included in the plurality of micro-optical element rows comprises a first lens type, a second row of micro-optical elements included in the plurality of micro-optical element rows comprises a second lens type, a third row of micro-optical elements included in the plurality of micro-optical element rows comprises a third lens type, and each of the first lens type, second lens type, and third lens type is a different lens type.

16. The lighting system of claim 14, wherein a light-emitting surface area of each LED included in the array of RGB LEDs is less than about 1 mm$^2$.

17. The lighting system of claim 14, wherein each lighting module is positioned 12 inches to 36 inches from a projected upon surface of the ceiling structure.

* * * * *